(No Model.)

R. D. ROTH.
COW MILKER.

No. 335,042. Patented Jan. 26, 1886.

WITNESSES:
INVENTOR:
R. D. Roth
BY Munn & Co.
ATTORNEYS.

N. PETERS, Photo-Lithographer, Washington, D. C.

UNITED STATES PATENT OFFICE.

REUBEN D. ROTH, OF MUMMASBURG, PENNSYLVANIA.

COW-MILKER.

SPECIFICATION forming part of Letters Patent No. 335,042, dated January 26, 1886.

Application filed September 24, 1885. Serial No. 178,034. (No model.)

*To all whom it may concern:*

Be it known that I, REUBEN D. ROTH, of Mummasburg, in the county of Adams and State of Pennsylvania, have invented a new and Improved Cow-Milker, of which the following is a full, clear, and exact description.

My invention relates to devices for milking cows, and has for its object to provide a simple inexpensive milker which may be operated easily and effectively and by unskilled persons, and which will not distress the animal, and will have an action on the teats like that of hand-milking, and which may be operated with safety in milking unruly animals.

The invention consists in certain novel features of construction and combinations of parts of the cow-milker, all as hereinafter fully described and claimed.

Reference is to be had to the accompanying drawings, forming part of this specification, in which similar letters of reference indicate corresponding parts in both the figures.

Figure 1:
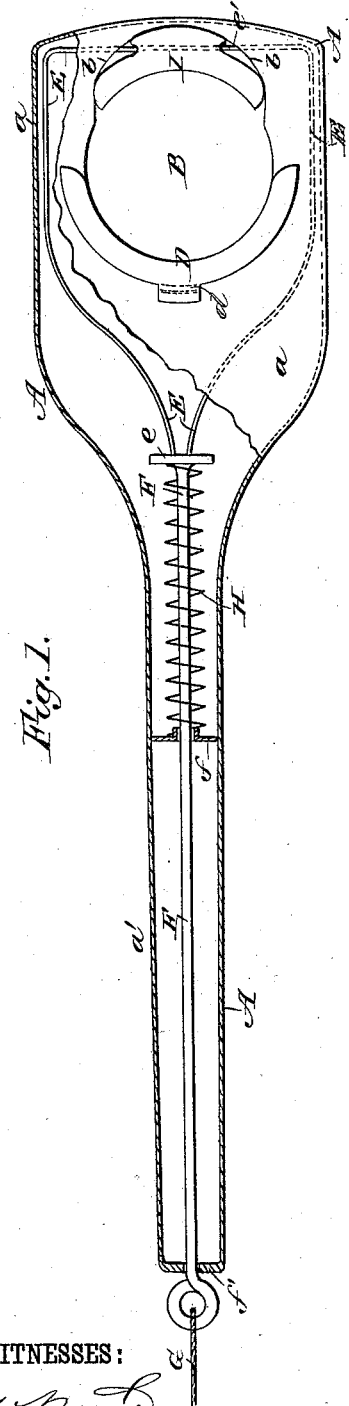
Figure 2:
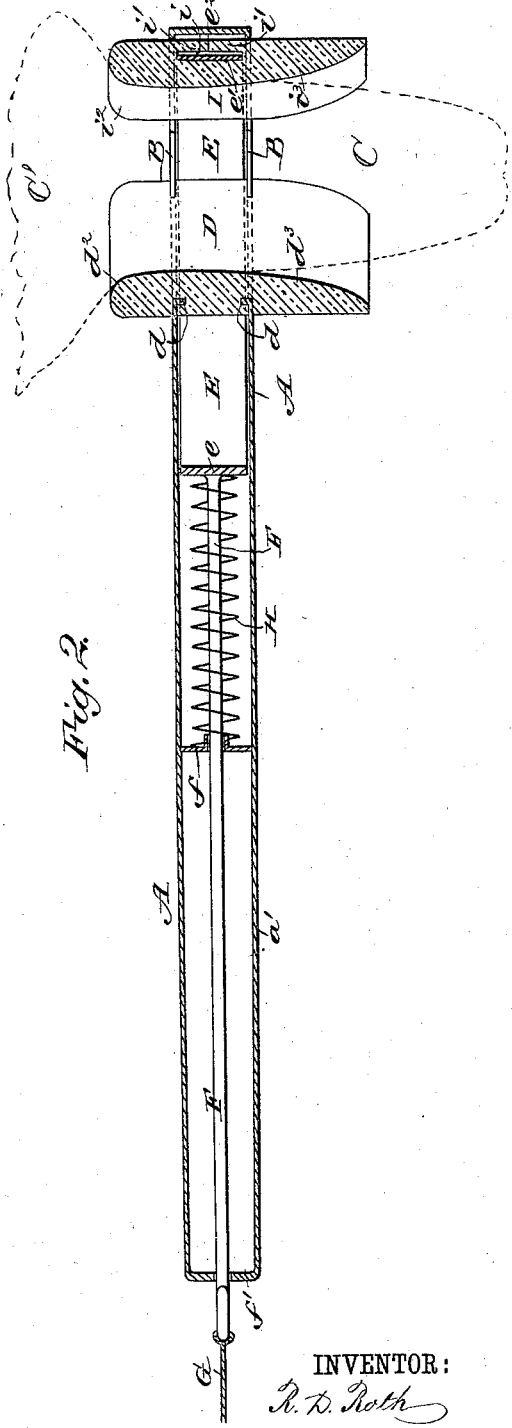

Figure 1 is a plan view of my improved cow-milker with the sheet-metal case partly broken away and in section; and Fig. 2 is a central longitudinal sectional side elevation of the milker, and shows in dotted lines the cow's teat, to which it is applied as in use.

The letter A indicates a case, made, preferably, of sheet metal, as shown, and with an enlarged outer end or head portion, $a$, and a stem or handle portion, $a'$, the head $a$ having a comparatively broad and flat form.

In the top and bottom walls or sides of the case-head $a$ are formed apertures, as at B, into and through which the cow's teat C may pass, as shown in dotted lines in Fig. 2, and at the inner or rear margin of the apertures at B is attached the india-rubber or gum teat-clamping plate or presser D, which has a general semicircular form, and is held to the case A preferably by means of inbent hooks $d$ $d$, formed on the case, entering recesses or notches of the presser D, and allowing the elastic presser to readily be removed from the case A by bending or springing it out of the hooks $d$ $d$ to substitute other larger or smaller pressers or new pressers, as may be required.

Within the head $a$ of case A is fitted loosely the frame E, made of a bent strip of metal, and with its back ends converging and fixed to a collar, $e$, to which is fixed the inner end of a stem or rod, F, which passes through a collar, $f$, fixed in the handle $a'$ of the case A, and also through the back end, $f'$, of said handle, the rod F thus being guided by the collar $f$ and handle end $f'$ as the frame E is drawn backward in the case-head $a$, and preferably by means of a cord, G, attached to the back end of the rod F. A spring, H, placed on the rod F between the collars $e$ and $f$, forces the frame E outward when the pull on the cord G is relaxed.

To the outer cross-bar or piece of the frame E is attached the india-rubber or gum teat-clamping plate or presser I, which at its inner face has a semicircular form, and is held to the frame E and directly opposite the presser D by the passage of the cross-bar $e'$ of the frame into a slot, $i$, formed through the presser near its back or outer face, that portion of the presser outside of the bar $e'$ being slit or cut through, as at $e^2$, to form lips $i'$ $i'$, which lock outside of the bar $e'$ after the elastic presser C has been doubled or bent over to allow passage of the bar $e'$ within the slot $i$ through the slit $e^2$, and which method of attachment will allow the presser C to be removed easily for substitution of other pressers, as occasion may require. The opposite sides of the head $a$ of the case A are cut away, as at $b$, thereby forming forward extensions of the apertures B, into which the presser I is forced by the spring H. (See Fig. 1.)

The upper inner corners of the curved teat-pressers D I are rounded over, as at $d^2$ $i^2$, so as not to hurt the udder or bag C' of the animal when the milker is applied to the teat C, and the acting faces of the pressers D I have a gradual outward curve toward their lower ends, as at $d^3$ $i^3$, so that they will exert a pressure on the teat from its upper part gradually toward the end of the teat, or, in other words, will have a drawing action on the teat quite like that given the teat when milking the animal by hand.

In operating the milker its handle $a'$ will be held in one hand and the cord G will be taken hold of by the other hand, and when the pressers D I are passed onto the animal's teat C, as in Fig. 2, the cord G will be pulled to draw the presser I backward or toward the presser D to squeeze the teat between the two pressers to cause the milk to flow from the teat, and when the pull on the cord is relaxed the spring H will force the presser I backward to allow the milk to flow to the teat, so as to be squeezed from it the next time the cord G is pulled.

It is evident that two, three, or four of the milkers may be held by their handles in one hand while their pressers are adjusted to teats of the animal, and the cords G of all the milkers will be grasped by the other hand, so that they may be pulled simultaneously for milking two, three, or all the teats at once, if desired; and it will also be seen that the person using the milker may keep at a safe distance from unruly animals. Furthermore, the animals may easily be milked by the milker when used by persons not skilled in hand-milking, and which at times would be advantageous.

Having thus described my invention, what I claim as new, and desire to secure by Letters Patent, is—

1. The combination, in a cow-milker, of a case or head-piece provided with an elongated handle and a teat-receiving recess, and a sliding presser-frame fitting in the head-piece and provided with a recess facing the teat-receiving recess of the head-piece, and a stem connected to the presser and passing along the handle for operating the said presser, substantially as and for the purpose herein set forth.

2. The combination, in a cow-milker, of a case, A, having an elongated handle, $a'$, and apertured at B to receive the teat, an elastic presser, D, at one side of said aperture, a frame, E, fitted to slide in case A, and provided with an elastic presser, I, facing the presser D, and having a stem, F, passing along the case-handle $a'$, and a spring, H, acting to project the frame E when the back pull on said frame is relaxed, substantially as herein set forth.

3. The combination, in a cow-milker, of a case, A, having an elongated handle, $a'$, and apertured at B to receive the teat, an elastic presser, D, at one side of said aperture, a frame, E, fitted to slide in case A, and having an elastic presser, I, facing the presser D, and provided also with a stem, F, passing along the case-handle $a'$, a pull cord, G, attached to stem F, and a spring, H, acting to project the frame E when the pull on cord G is relaxed, substantially as herein set forth.

4. A cow-milker provided with elastic teat-clamping plates or pressers D I, formed with rounded upper corners, as at $d^2\ i^2$, and with faces having gradual outward curves toward their lower ends, as at $d^3\ i^3$, substantially as herein set forth.

REUBEN D. ROTH.

Witnesses:
J. F. HARTMAN,
CORNELIUS STEINOUR.